United States Patent Office 2,901,446
Patented Aug. 25, 1959

2,901,446

PROCESS FOR PRODUCING RIGID EXPANDED POLYVINYL CHLORIDE

John Gilmour Hawkins, Leicester, England, assignor to Whiffen and Sons Limited, London, England No Drawing. Application February 11, 1957
Serial No. 639,236

Claims priority, application Great Britain March 8, 1956

4 Claims. (Cl. 260—2.5)

The present invention relates to an improved process for the production of expanded thermoplastic materials, and particularly to the production of rigid or substantially rigid thermoplastic materials.

It is well known that by incorporating in a thermoplastic composition of the appropriate characteristics a compound capable of decomposing on heating with the liberation of gases, commonly termed a blowing agent, and thereafter heating the composition it is possible to obtain an expanded composition. In one type of process the thermoplastic material and the blowing agent are admixed together and then heated under pressure so as to gel the thermoplastic material and decompose the blowing agent, but preventing the expansion of the material by the application of pressure, thereafter cooling the product while still under pressure and when cold expanding the product by the application of heat without accompanying pressure.

By processes of this type it is possible to obtain either soft expanded products or rigid expanded products, it being well known that the determining factor is the presence or otherwise of plasticizers and other compounds which affect the physical characteristics of the product. In order to obtain a uniform standard expanded product it is essential for the chemical blowing agent employed to be intimately admixed with the thermoplastic material. Where it is desired to obtain soft products this does not present exceptional difficulty as the composition to be expanded may contain substantial proportions of plasticizers and the like which facilitate the incorporation of the blowing agent. However, where it is desired to obtain a rigid product which consequently restricts the inclusion of plasticizers in the mixture, considerable difficulty is met in obtaining the desired uniform dispersion of the blowing agent in the mix.

It has now been found that in a process of this type for the production of rigid expanded products greatly improved results over those obtainable hitherto are obtained by incorporating in the composition a hydrocarbon or halogenated hydrocarbon of medium boiling point.

Accordingly the present invention is for a process for producing expanded thermoplastic materials which comprises the steps of admixing the thermoplastic materials with a blowing agent and a hydrocarbon or halogenated hydrocarbon solvent of medium boiling point as hereinafter defined heating this mixture under pressure to decompose the blowing agent preferably at least partially cooling the product while still under pressure, and thereafter heating the product without the application of pressure to effect the expansion of the product. It is a preferred feature of the invention that the cooled product is subjected to the second heating step without being allowed to stand for any significant period. According to a preferred embodiment of the invention the product is subjected to the second heating step as soon as it has been cooled to the desired extent. The material in the press need only be cooled to such an extent that the product does not rupture on removal from the press. The product is for example cooled down to about 20–40° C. The expanded product obtained may if desired be subjected to a further heating step.

The thermoplastic material used in accordance with the present invention may comprise natural or synthetic rubbers or plastics such as the polymers and co-polymers derived from vinyl chloride, styrene, butadiene, acrylonitrile, acrylates, methacrylates, vinyl compounds, polyamides, superpolyamides and the like or mixtures of any of these. According to a preferred embodiment of the invention the thermoplastic material is polyvinyl chloride.

The blowing agent used in accordance with the present invention may comprise for example inorganic salts such as bicarbonates which liberate carbon dioxide, or organic compounds such as azo-compounds for example azodiisobutyric dinitrile and azodiisobutyric amideoxime; azo amides, for example, azodicarbonamide; sulphonylhydrazides, for example pp'oxybis (benzene sulphonyl hydrazide) and benzene sulphonylhydrazide; hydrazones, for example, benzil hydrazones; organic nitrites, for example, tertiary butylamine nitrite; nitroso compounds, e.g., N:N-dinitroso-ethyleneurea, N:N'-dinitroso-N:N'-dimethylterephthalamide and dinitrosopentamethylene tetramine; ureas and salts of ureas, for example urea oxalate; substituted ureas and salts of substituted ureas, for example, aminoguanidine bicarbonate and nitrourea; and the like. According to a preferred embodiment of the invention the blowing agent is azodiisobutyric dinitrile.

The proportion of blowing agent employed may vary over a wide range depending on the nature and characteristics of the blowing agent and the extent of expansion of the product which it is desired to obtain. In general with blowing agents of the order of activity of the blowing agents indicated above, the amount of blowing agent used will comprise about 5–40% by weight of the weight of thermoplastic material. The proportions most usually employed fall within the range 10–30% by weight of thermoplastic material.

The hydrocarbon or halogenated hydrocarbon solvent of medium boiling point which is used is suitably one of a boiling point above 80° C. and for example in the range of about 100°–200° C. Solvents which may be mentioned include 1:1:2:2-tetrachlorethane, 1:1:1:2-tetrachlorethane, tetrachlorethylene, trichlorethylene, ethylene dichloride, monochlorbenzene, toluene, xylene and the like. According to a preferred embodiment of the invention the solvent is a halogenated hydrocarbon such as 1:1:2:2-tetrachloroethane, 1:1:1:2-tetrachloroethane or trichloroethylene. The preferred solvent is 1:1:2:2-tetrachloroethane.

The amount of solvent employed in accordance with the process of the present invention may vary over a wide range. In general it has been found suitable to use about equal proportions of solvent and thermoplastic material, but the amount of solvent may be greater or less than this. Thus for example the amount of solvent may fall within the range about 50%–200% of the weight of the thermoplastic material.

The process is suitably carried out by mixing the thermoplastic material as a paste with the blowing agent and the solvent and any other desired components such as plasticizers, fillers, pigments and the like, and charging the mixture into the mould, either fully or partially loading the mould. The mixture in the mould is then heated under pressure greater than atmospheric for example of the order 3 to 7 tons per square inch to decompose the blowing agent, and the product is thereafter cooled and released from the press. The cooled product is then reheated to effect expansion, as by heating in an air oven, for example for 24 hours or by any other heating means. According to another embodiment the cooled product is heated to effect expansion, and the expanded product is then suitably subjected to a final heating step as by heating in an air oven at about 100° C. for 24 hours to cure or set the product. The reheating of the cooled product may be carried out in any suitable way as for example in a water bath or air oven or in an infra-red or high frequency heater.

By the employment of the present invention it is possible to obtain an expanded product of light density in a process which can be simply controlled and which is readily reproduceable. The advantages attendant upon the employment of the present invention include the facts that a liquid mix may be obtained employing useable proportions of the specified solvent and the plastic material, the formation of the liquid mix ensuring that excellent dispersion of the blowing agent is obtained together with simpler handling of the mix. As a result it is possible to obtain the maximum desired expansion together with a uniform blown structure.

The following examples are given to illustrate the process of the present invention.

*Example 1*

A mixture is prepared containing the following components:

| | Parts |
|---|---|
| Polyvinylchloride (paste forming grade) | 100 |
| Lead stearate | 3 |
| Azodiisobutyric dinitrile | 30 |
| Tetrachloroethane | 100 |

The components are mixed cold and passed twice through a cold triple-roll mill. A suitable mould is then fully loaded with the paste and heated to 160–165° C. between the platens of a hydraulic press at a pressure of 3 to 7 tons per square inch.

After cooling the material is released from the press and is then heated for 18 hours in an air oven at about 100° C.

The rigid product thus obtained has a density of approximately 1½ pounds per cubic foot. This product is suitable for the construction of a light-weight sound and heat insulating "sandwich" type partition material, and for flotation purposes.

*Example 2*

The process of Example 1 was repeated exactly as described above employing 20 parts of azodiisobutyric dinitrile in place of the 30 parts indicated above.

The expansion of the product is 950%, and the rigid product has a density of 4.2 pounds per cubic foot.

*Example 3*

The process of Example 1 was repeated exactly as described above employing 10 parts of azodiisobutyric dinitrile in place of the 30 parts indicated above.

The expansion of the product is 550% and the rigid product has a density of 8.0 pounds per cubic foot.

*Example 4*

A mixture is prepared containing the following components:

| | Parts |
|---|---|
| Polyvinylchloride | 100 |
| Lead stearate | 3 |
| Azodiisobutyric dinitrile | 30 |
| White spirit | 10 |
| Xylene | 100 |

The components are mixed cold and are passed twice through a cold triple roll mill. A suitable mould is then fully loaded with the paste and heated to 160° C. between the platens of a hydraulic press. The press is then allowed to cool and after cooling the material is released from the press and is heated in an air oven for one hour at 90° C. to effect the expansion of the product.

The expanded product is then heated for a further 24 hours in an air oven at about 100° C. The rigid product thus obtained has a density of approximately 2.4 pounds per cubic foot.

*Example 5*

A mixture is prepared containing the following components:

| | Parts |
|---|---|
| Vinylchloride/vinylidene chloride copolymer | 100 |
| Lead stearate | 3 |
| Azodiisobutyric dinitrile | 30 |
| Toluene | 100 |

The components are mixed cold and passed twice through a cold triple roll mill; a suitable mould is then fully loaded with the paste and heated to 150° C. between the platens of a hydraulic press at a pressure of 3 to 7 tons per square inch. After cooling the material is released from the press and is immersed in a water bath for one hour at 90° C. effecting the expansion of the product. The expanded rigid product is then heated for 24 hours in an air oven at about 100° C.

*Example 6*

A mixture is prepared containing the following components:

| | Parts |
|---|---|
| Vinylchloride/vinylacetate copolymer | 100 |
| Dibutyltin dilaurate | 3 |
| N:N'-dimethyl-N:N'-dinitroso terephthalamide | 15 |
| Tetrachloroethane | 100 |

The components are mixed cold and passed twice through a cold triple roll mill. A suitable mould is then fully loaded with the paste and heated to 160° C. between the platens of a hydraulic press. The press is cooled and after cooling the material is released from the press and immersed in a water bath for one hour at 90° C. to effect the expansion of the product. The expanded rigid product is then heated for 24 hours in an air oven at 100° C.

*Example 7*

A mixture is prepared containing the following components:

| | Parts |
|---|---|
| Polyvinylchloride | 100 |
| Calcium stearate | 3 |
| pp'-Oxybis (benzene sulphonyl hydrazide) | 30 |
| Tetrachlorethane | 100 |

The components are mixed cold and passed twice through a cold triple roll mill. A suitable mould is then fully loaded with the paste and heated between the platens of a hydraulic press the temperature and pressure being increased stepwise. After cooling the material is released from the press and immersed in a water bath for one hour at 90° C. effecting the expansion of the product. The expanded product is then heated for 24 hours in an air oven at about 100° C. The expansion of the product is 1150% and the rigid product thus obtained has a density of approximately 3.6 pounds per cubic foot.

*Example 8*

A mixture is prepared containing the following components:

| | Parts |
|---|---|
| Polyvinylchloride | 100 |
| Calcium stearate | 5 |
| Azodiisobutyricamideoxime | 20 |
| Tetrachloroethane | 125 |

This mixture is processed as described in Example 7 and the expansion of the product is 900%, the rigid product having a density of 4 pounds per cubic foot.

Example 9

A mixture is prepared containing the following components:

| | Parts |
|---|---|
| Polyvinylchloride | 100 |
| Calcium carbonate filler | 25 |
| Lead stearate | 5 |
| Azodiisobutyric dinitrile | 30 |
| Tetrachloroethane | 100 |

This mixture is processed as described in Example 7 and the expansion of the product is 1670%, the rigid product having a density of 2.8 pounds per cubic foot.

Examples 10–16

The process of Example 1 was repeated successively employing in place of tetrachlorethane the solvent indicated in column 1 of the table below. The extent of expansion of the product is given in column 2 and the density of the rigid expanded product is given in column 3.

| Example | Column 1 Solvent | Column 2 Expansion, percent | Column 3 Density, pounds per cubic foot |
|---|---|---|---|
| 10 | 100 parts tetrachlorethylene | 1,300 | 2.9 |
| 11 | 100 parts trichlorethylene | 2,000 | 2.1 |
| 12 | 150 parts ethylenedichloride | 1,100 | 2.5 |
| 13 | 100 parts monochlorbenzene | 1,750 | 2.0 |
| 14 | 100 parts toluene | 1,150 | 2.5 |
| 15 | Mixture comprising 50 parts tetrachlorethylene, 50 parts monochlorbenzene and 10 parts white spirit. | 1,360 | 2.3 |
| 16 | Mixture comprising 50 parts tetrachlorethane and 50 parts monochlorbenzene. | 1,500 | 2.1 |

The reference to tetrachlorethane where it appears in the foregoing examples indicates the commercial product sold under this name which comprises essentially 1:1:2:2-tetrachlorethane.

I claim:

1. A process for producing rigid expanded polyvinyl chloride which comprises the steps of admixing polyvinyl chloride with a chemical blowing agent and a halogenated hydrocarbon selected from the group consisting of 1:1:2:2-tetrachloroethane, 1:1:1:2-tetrachloroethane and tetrachloroethylene, heating this mixture under pressure to decompose the chemical blowing agent and thereafter reheating the product to effect expansion.

2. A process for producing rigid expanded polyvinyl chloride which comprises the steps of admixing polyvinyl chloride with azodiisobutyric dinitrile and 1:1:2:2-tetrachloroethane, heating this mixture under pressure to decompose the azodiisobutyric dinitrile and thereafter reheating the product to effect expansion.

3. A process which comprises the steps of admixing polyvinyl chloride with a chemical blowing agent and a halogenated hydrocarbon selected from the group consisting of 1:1:2:2-tetrachloroethane, 1:1:1:2-tetrachloroethane and tetrachloroethylene, heating the resulting mixture under pressure to decompose the blowing agent, cooling the product while under pressure, reducing the pressure to atmospheric pressure, and reheating to produce an expanded thermoplastic material.

4. A process which comprises the steps of heating under pressure, in order to decompose the blowing agent therein, a mixture consisting essentially of polyvinyl chloride, a chemical blowing agent and a halogenated hydrocarbon selected from the group consisting of 1:1:2:2-tetrachloroethane, 1:1:1:2-tetrachloroethane and tetrachloroethylene; cooling the product while under pressure; releasing the pressure and reheating to produce an expanded thermoplastic.

References Cited in the file of this patent

UNITED STATES PATENTS

| | | |
|---|---|---|
| 2,386,995 | Wigal | Oct. 16, 1945 |
| 2,406,319 | Brooks et al. | Aug. 27, 1946 |
| 2,442,940 | Staudinger | June 8, 1948 |
| 2,498,074 | Feldman | Feb. 21, 1950 |
| 2,525,880 | Feldman | Oct. 17, 1950 |
| 2,570,182 | Daly et al. | Oct. 9, 1951 |